of Patent Office
2,832,233
Patented Apr. 29, 1958

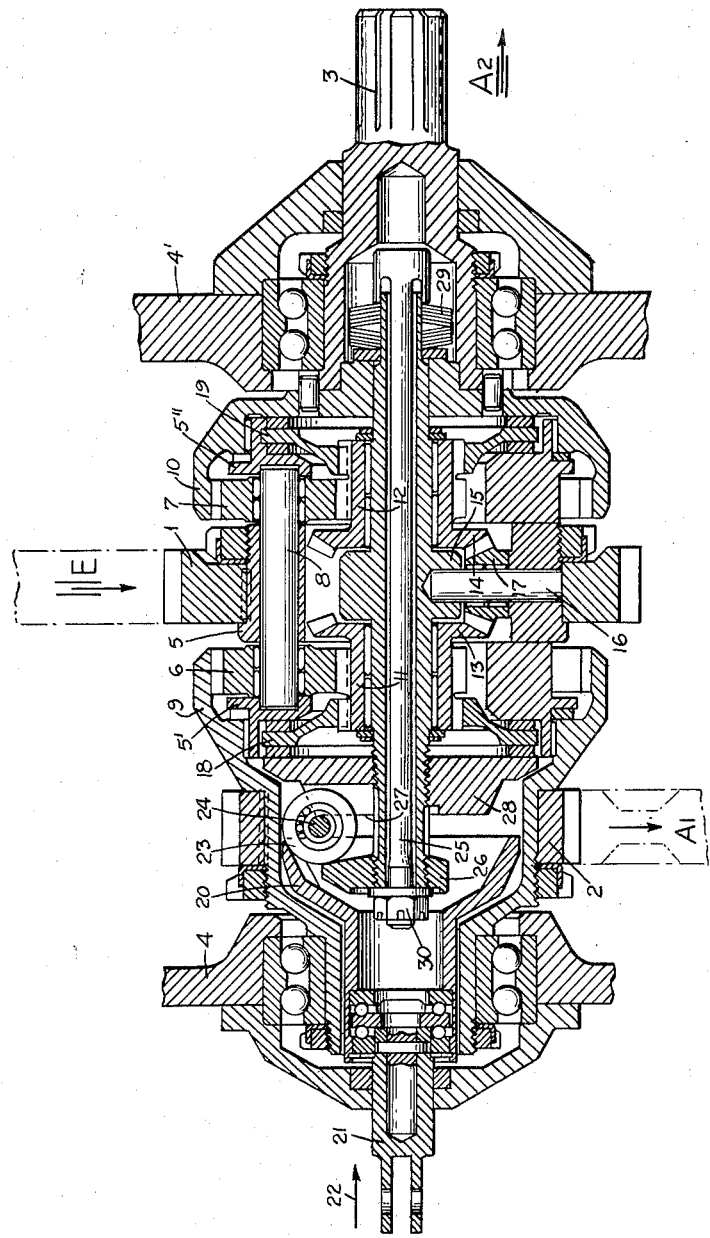

2,832,233

POWER TRANSMITTING ARRANGEMENT

Erwin Allgaier and Wolfgang Hütter, Uhingen, Wurttemberg, and Kaspar Ritter, Kirchheim, Teck, Germany, assignors to Allgaier-Werke G. m. b. H., Uhingen, Wurttemberg, Germany Application April 25, 1956, Serial No. 580,644

Claims priority, application Germany April 29, 1955

10 Claims. (Cl. 74—674)

The present invention relates to a power transmitting arrangement.

More particularly, the present invention relates to a power transmitting arrangement where a drive is transmitted from a drive means to a plurality of driven means through a differential arrangement.

For example, in driving a plurality of shafts of a vehicle or the like a drive is transmitted from a single source of energy to at least a pair of driven means.

With arrangements of this type the total turning moment which can be derived from the drive means is distributed between the plurality of driven means which may rotate at different speeds of operation. Where, for example, a pair of such driven means are provided, it is desirable to provide a means for eliminating the distribution of the drive between the pair of driven means when the resistance to turning of one of the driven means is extremely small or entirely lacking. In such an event, if the ratio of distribution of the drive to the pair of driven means were maintained, then only an extremely small driving force could be obtained at the one driven means which continues to operate. Therefore, in order to take care of the elimination of the operation of one of the driven means, a blocking device is usually provided in order to block the operation of the differential and thus transmit all of the power of the drive means to the one driven means, for example, which continues to operate. Inasmuch as an extremely large turning moment is now transmitted to this one driven means, it is possible that the components thereof will be stressed to an extremely great degree, and in order to avoid such an undesirable result, the turning moment transmitted under these circumstances only from the drive means to the one driven means is limited.

All of the conventional solutions to the problem of limiting the drive to one driven means which is usually distributed among a plurality of driven means involve extremely complicated, expensive structures which have not proved to be practical.

One of the objects of the present invention is to provide a power transmitting arrangement of the above type with an extremely compact, and relatively inexpensive means for limiting the turning moment transmitted to one driven means when the total turning moment from a drive means to this one driven means reaches a certain value.

Another object of the present invention is to provide a power transmitting arrangement capable of distributing the power from a single drive to a plurality of driven means and capable of limiting the drive to only one of these driven means by controlling only a fraction of the turning moment delivered by the drive means.

A further object of the present invention is to provide an adjusting means for limiting the maximum turning moment which can be transferred from the drive means to only one driven means.

An additional object of the present invention is to provide an adjustable friction clutch means capable of limiting the turning moment with which a drive is transmitted and capable of being adjusted with a structure which operates with an extremely small friction loss.

With the above objects in view the present invention mainly consists of a power transmitting arrangement which includes a drive means, a pair of driven means, and a pair of differential means for transmitting the drive from the drive means to the pair of driven means, respectively, so that the driven means are driven by the drive means with predetermined turning moments, respectively. A third differential means interconnects the pair of differential means and is operated by the drive means at a fraction of the turning moment with which the pair of driven means are operated. An adjustable friction clutch means cooperates with the third differential means for adjustably determining the force at which the third differential means will be able to cause the friction clutch means to slip.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

The drawing shows a power transmitting arrangement according to the invention in a longitudinal sectional view. In the drawing the power is derived from any suitable engine or the like and is transmitted in the direction of arrow E to the gear 1, this gear 1 being a simple spur gear. Thus, the gear 1 forms a drive means, and the drive therefrom is transmitted to a pair of driven means in the form of a spur gear 2 and a short splined shaft 3, the power being transmitted from the driven means 2 in the direction of arrow $A_1$ and from the driven means 3 in the direction of $A_2$. Such a power transmitting arrangement has many uses and may be used, for example, to drive a plurality of drive shafts of a motor driven vehicle or to transmit the drive from a front vehicle to wheels of a trailer connected thereto.

The structure shown in the drawing is located within a suitable housing of which only the portions 4 and 4' of its end walls are shown. These wall portions 4 and 4' of the housing are formed with coaxial openings, respectively, and in these openings the walls 4 and 4' carry suitable ball bearings, as shown in the drawing. The left ball bearing of the drawing, which is carried by the wall 4, turnably supports an elongated tubular hollow member which increases in diameter from its left end toward its right end and which terminates at its right end in ring gear 9. The gear 2 surrounds and is fixed to this elongated hollow member so as to be turnable therewith. A second elongated hollow member is turnably supported by the other ball bearings and terminates at its right end in the splined shaft 3. This second hollow member terminates at its left end in ring gear 10, and the ring gears 9 and 10 are coaxial with each other and with the ball bearings. It will be noted that the gears 9 and 10 are spaced from each other and that the drive gear 1 is located between the gears 9 and 10.

An annular support ring 5 is surrounded by and fixed to the gear 1, while an annular support member 5' is carried within the sun gear 9 for free rotation with respect thereto. A similar annular support member 5" is turnably carried by the sun gear 10 within the latter for free rotation with respect thereto, these three support rings 5, 5', and 5" being coaxial with respect to each other and with respect to the sun gears 9 and 10. A plurality of planetary gears 6 mesh with the ring gear 9 while a plurality of planetary gears 7 mesh with the ring gear 10. The gears 7 are respectively aligned with the gears 6, and a shaft 8 extends through and beyond the ring 5 and turnably carries each pair of aligned planetary gears 6 and 7, as shown in the drawing. The ends of the shaft 8 are respectively affixed to the support members 5' and 5". In this way, not only are the planetary gears 6 and 7 supported for rotation about their axis, but also the ring 5 and drive gear 1 are supported for rotation. It will be noted that suitable needle bearings are provided to turnably support the planetary gears 6 and 7 on the shafts 8. The planetary gears 6 mesh with an axially bored hollow sun gear 11, while the planetary gears 7 mesh with an axially bored hollow sun gear 12. Thus, the gears 6, 11, and 9 form one differential means for transmitting the drive from the drive means 1 to the driven means 2, while the gears 7, 10, and 12 form a second differential means for transmitting the drive from the drive means 1 to the driven means 3.

A bevel gear 13 is fixed to the hollow gear 11 as by being formed integrally therewith, and a bevel gear 14 is fixed to the hollow gear 12 for rotation therewith as by being formed integrally therewith. A plurality of pins 16 are fixed to the ring 5 and extend radially toward the axis thereof, and these pins 16 turnably support a plurality of beveled planetary gears 17 for rotation about their axes, respectively, these planetary gears 17 meshing with the beveled sun gears 13 and 14. Thus, the gears 13, 14, and 17 form a third differential means which interconnects the pair of differential means which transmit the drive from the drive means 1 to the driven means 2 and 3.

An elongated hollow tube 15 extends coaxially through the hollow sun gears 11 and 12 and beyond the latter, as shown in the drawing, and the pins 16 are fixed to the tube 15 so that the latter turns with the drive means 1. It will be noted that needle bearings are provided to turnably support the gears 11 and 12 for rotation with respect to the tube 15. An elongated rod 25 extends through and beyond the tube 15, and the right end of the rod 25, as viewed in the drawing, is enlarged and provided with an annular groove into which the right end of the tube 15 slidably extends. This right end of the tube 15 carries a spring means 29 in the form of a plurality of opposed dished springs, and these springs which form the spring means 29 urge the rod 25 to the right, as viewed in the drawing, by engaging the right enlarged end thereof. The left end of the spring means 29 engages a washer which in turn engages a part of the ring gear 10 which is not axially shiftable. The left end of the rod 25 threadedly carries a nut 30 which engages a washer which in turn engages an adjusting member 26 which is axially shiftable on the tube 15 so that when the adjusting member 26 moves to the left, as viewed in the drawing, for example, the rod 25 will be moved to the left in order to compress the spring means 29. A second adjusting member 28 is carried by the tube 15 and is axially spaced from the adjusting member 26. This second adjusting member 28 is also axially shiftable on the tube 15. Nut 30 adjusts spring means 29.

A disk 18 which forms part of a friction clutch is fixed to the hollow gear 11 for rotation therewith. However, the portion of the hollow gear 11 which engages the disk 18 is splined and this disk 18 has internal teeth engaging the splines of the gear 11 so that the disk 18 is constrained to rotate with the hollow gear 11 but is axially shiftable with respect to the same. In the same way a disk 19 of a friction clutch is also connected to the hollow gear 12 for rotation therewith but for axial movement with respect to the same. The opposite faces of the disks 18 and 19 carry friction rings made of a suitable friction material such as the material used for brake linings, for example. The left friction ring fixed to the disk 18, as viewed in the drawing, engages the right face of the adjusting member 28, while the right friction ring fixed to the disk 18 engages on annular surface of the support member 5'. The left friction ring fixed to the disk 19 engages an annular face of the support member 5" while the right friction ring fixed to the disk 19 engages a face of the internal gear 10. Thus, these friction rings together with the discs 18 and 19 are capable of slipping with respect to the surfaces which they engage.

The adjusting member 28 is formed in its left face, as viewed in the drawing, with a radially extending groove into which a roller 23 extends, this roller 23 engaging the right face of the adjusting member 26, and it will be noted that this right face of the adjusting member 26 is curved so as to form a camming surface which cooperates with the roller 23. This roller 23 is turnably carried by a bearing which is in turn carried by a roller 24 in the form of a relatively short shaft which extends through and beyond the roller 23, which is coaxial with the latter, and which engages the left face 27 of the adjusting member 28, as viewed in the drawing. For example, the shaft 24 may carry a roller bearing which in turn carries the roller 23, so that in this way the rollers 23 and 24 are freely turnable with respect to each other. The groove of the adjusting member 28 into which the roller 23 extends is deeper than the radial distance by which the roller 23 extends beyond the roller 24, so that while the roller 23 is located within this groove it does not engage the inner face of the groove and thus there is no frictional rubbing between the roller 23 and the adjusting member 28. The force which tends to move the roller 23 to the right simply presses the roller 24 against the rear face 27 of adjusting member 28, this roller 24 simply bridging the groove formed in the member 28. It is believed to be apparent that as the members 23 and 24 approach the tube 15 they will cause the adjusting member 26, due to the camming surface thereof, to move to the left, as viewed in the drawing, away from the adjusting member 28, so as to pull the rod 25 to the left and compress the spring 29 which will cause the force required to produce slipping in the friction clutches to be increased.

A hollow dished member 20 is formed at its inner face with a groove into which the roller 23 extends, and this dished member 20 engages the roller 23 with the inclined inner face of this groove, as is evident from the drawing. The member 20 freely surrounds the adjusting member 26 as well as the nut 30 and the left end portion of the tube 15 and the rod 25. The left tubular end of the member 20 is connected through suitable thrust bearings with a shiftable member 21 which is supported in the manner shown in the drawing for axial shifting movement. Any suitable linkage which may be manually controlled is connected to the member 21 for shifting the latter in the direction of arrow 22 shown in the drawing. Such shifting of member 21 will cause the dished member 20 to move the roller 23 downwardly between the adjusting members 26 and 28, as viewed in the drawing, so as to cause these members to move further apart from each other and thus increase the force required to produce slippage in the friction clutch means. It will be noted that with this arrangement of the rollers 23 and 24 there is no frictional rubbing of the latter elements with respect to the parts engaged thereby so that the adjustment of the friction clutch means takes place with a minimum of friction loss.

During normal operation the gears 13 and 14 of the third differential means are free to turn in opposite directions so that the turning moment from the drive means 1 may be transmitted in any desired ratio to the pair of driven means 2 and 3. For example, the driven means 2 may be used to drive a front car, while the driven means 3 may be used to transmit the drive to a trailer connected to such a front car. It will be noted that with the arrangement of the invention the differential means 13, 14, 17 will be turned with a turning moment which is smaller than the possible maximum turning moment by the ratio of the radius of gears 13 and 14 to the radius of gear 1. On the other hand, these gears 13 and 14 may rotate in opposite directions with a speed greater than that of the gear 1 by the inverse of this ratio, so that the structure may be designed to distribute the drive from the drive means 1 to the driven means 2 and 3 in any desired proportions, and at the same time only a fraction of the turning moment transmitted to the driven means is transmitted to the third differential means, 13, 14, 17.

If it is now assumed that a trailer, as in the above example, is disconnected from the first car so that there is no resistance to the turning of the driven means 3, then if the parts remain as they were when the trailer was connected to the first car, it will be possible to derive very little power from the driven means 2 because it will still have the same ratio of power of the driven means 3, and the lack of resistance at the latter will cause almost no power to be used by the driven means 3. Therefore, it is necessary to block the differential action at this time, and this is done by shifting the member 21 in the direction of the arrow 22 so as to provide a considerable force required to cause the disks 18 and 19 of the friction clutch means to slip. When the friction clutch means is thus adjusted, the gears 13 and 14 will be prevented from rotating in opposite directions with respect to each other and the desired power will now be transmitted from the drive means 1 to the driven means 2. However, it will not be possible to drive the driven means 2 with the entire turning moment which can be derived from the gear 1 because as the power transmitted from the latter to the gear 2 is increased, a time will come when the turning moment will be sufficient to produce slippage of the friction clutch means. In this way the components of the structure cannot be undesirably stressed.

It will be noted that the above described structure of the invention is exceedingly compact because the friction clutch means is housed within the plurality of differential means. Furthermore, it will be noted that the friction clutch means as well as the plurality of differential means are symmetrically arranged with respect to the drive means 1. Not only is a small amount of space required by the structure of the invention, but in addition it is relatively inexpensive to manufacture and it operates very reliably because all of the structure may be located in a common housing and may be located in a common oil bath which efficiently carries away heat.

It will be understood that each of the elements described above, or two or more together, may also find a useful application in other types of power transmitting arrangements differing from the types described above.

While the invention has been illustrated and described as embodied in differential transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A power transmitting arrangement comprising, in combination, drive means; a pair of differential means cooperating with said drive means for respectively transmitting drives of predetermined turning moments from said drive means; a third differential means interconnecting said pair of differential means and being driven by said drive means at a turning moment substantially smaller than that of said pair of differential means; and adjustable friction clutch means cooperating with said third differential means for blocking the operation thereof until a predetermined turning moment is reached.

2. A power transmitting arrangement comprising, in combination, drive means; a pair of differential means cooperating with said drive means for respectively transmitting drives of predetermined turning moments from said drive means; a third differential means interconnecting said pair of differential means and being driven by said drive means at a turning moment substantially smaller than that of said pair of differential means; and adjustable friction clutch means cooperating with said third differential means for blocking the operation thereof until a predetermined turning moment is reached, said friction clutch means being housed within said pair of differential means and said third differential means.

3. A power transmitting arrangement comprising, in combination, drive means; a pair of differential means connected directly with said drive means for respectively transmitting drives of predetermined turning moments from said drive means; a third differential means interconnecting said pair of differential means and being driven by said drive means at a turning moment substantially smaller than that of said pair of differential means; and adjustable friction clutch means cooperating with said third differential means for blocking the operation thereof until a predetermined turning moment is reached, said pair of differential means, said third differential means, and said friction clutch means being symmetrically arranged with respect to said drive means.

4. A power transmitting arrangement comprising, in combination, drive means; a pair of differential means cooperating with said drive means for respectively transmitting drives of predetermined turning moments from said drive means; a third differential means interconnecting said pair of differential means and being driven by said drive means at a turning moment substantially smaller than that of said pair of differential means; and adjustable friction clutch means cooperating with said third differential means for blocking the operation thereof until a predetermined turning moment is reached, said adjustable friction clutch means including an adjusting means which includes a plurality of rolling bodies for carrying out adjustments of the friction clutch means with a minimum of friction loss.

5. A power transmitting arrangement comprising, in combination, support means; a pair of coaxial driven means spaced from each other and carried by said support means for rotation about a common axis; a pair of coaxial differential means operatively connected to said pair of driven means, respectively, for transmitting a drive thereto and located spaced from each other coaxially with said pair of driven means and between the latter; a third differential means interconnecting said pair of differential means and located between the latter; driven means located between said pair of differential means, surrounding said third differential means, and operatively connected to said pair of differential means and said third differential means for transmitting to the latter a turning moment substantially smaller than the turning moments transmitted from said drive means to said pair of differential means and through the latter to said pair of driven means, respectively; and friction clutch means respectively located on opposite sides of said pair of differential means respectively between the latter and said pair of driven means and passing through said third differential means for limiting the turning moment of the latter.

6. A power transmitting arrangement comprising, in combination, support means; a pair of coaxial driven means spaced from each other and carried by said support means for rotation about a common axis; a pair of coaxial differential means operatively connected to said pair of driven means, respectively, for transmitting a drive thereto and located spaced from each other coaxially with said pair of driven means and between the latter; a third differential means interconnecting said pair of differential means and located between the latter; drive means located between said pair of differential means, surrounding said third differential means, and operatively connected to said pair of differential means and said third differential means for transmitting to the latter a turning moment substantially smaller than the turning moments transmitted from said drive means to said pair of differential means and through the latter to said pair of driven means, respectively; friction clutch means respectively located on opposite sides of said pair of differential means respectively between the latter and said pair of driven means and passing through said third differential means for limiting the turning moment of the latter; and adjusting means operatively connected to said friction clutch means for adjusting the size of the turning moment at which said friction clutch means slips, said adjusting means including a pair of members movable away from each other for increasing the force required to cause said friction clutch means to slip, a pair of rollers freely turnable with respect to each other, coaxial with respect to each other, and respectively engaging said members for moving the same apart from each other when the common turning axis of said rollers moves in a direction perpendicular to said turning axis, and a shiftable member engaging one of said rollers for shifting the latter together with the other of said rollers.

7. A power transmitting arrangement comprising, in combination, support means; a pair of coaxial ring gears carried by said support means for rotation about their common axis; a pair of driven means operatively connected to said pair of ring gears for rotation therewith; a plurality of planetary gears meshing with said pair of ring gears; a pair of sun gears coaxial with the pair of ring gears and respectively meshing with the planetary gears which mesh with said ring gears, said pair of sun gears being formed with axial bores passing therethrough; an elongated hollow tube extending through and beyond said pair of sun gears and being freely turnable with respect to the latter about the common axis thereof; a pair of beveled sun gears respectively fixed to said pair of sun gears for rotation therewith and located between said pair of sun gears and being spaced from and directed toward each other; a plurality of beveled planetary gears meshing with said beveled sun gears; a ring surrounding said beveled gears and located between the planetary gears which mesh with said ring gears; a plurality of shafts respectively extending through said ring in a direction parallel to the common axis of said sun gears and each shaft turnable supporting at free ends respectively extending beyond said ring a planetary gear meshing with one of said ring gears and a planetary gear meshing with the other of said ring gears; a drive gear affixed to and surrounding said ring for rotating the latter and thereby transmitting a drive to said pair of driven means; and friction clutch means operatively connected to said beveled gears for preventing rotation thereof with respect to each other until a predetermined turning moment is applied to said beveled gears from said gear affixed to said ring.

8. A power transmitting arrangement comprising, in combination, support means; a pair of coaxial ring gears carried by said support means for rotation about their common axis; a pair of driven means operatively connected to said pair of ring gears for rotation therewith; a plurality of planetary gears meshing with said pair of ring gears; a pair of sun gears coaxial with the pair of ring gears and respectively meshing with the planetary gears which mesh with said ring gears, said pair of sun gears being formed with axial bores passing therethrough; an elongated hollow tube extending through and beyond said pair of sun gears and being freely turnable with respect to the latter about the common axis thereof; a pair of beveled sun gears respectively fixed to said pair of sun gears for rotation therewith and located between said pair of sun gears and being spaced from and directed toward each other; a plurality of beveled planetary gears meshing with said beveled sun gears; a ring surrounding said beveled gears and located between the planetary gears which mesh with said ring gears; a plurality of shafts respectively extending through said ring in a direction parallel to the common axis of said sun gears and each shaft turnably supporting at free ends respectively extending beyond said ring a planetary gear meshing with one of said ring gears and a planetary gear meshing with the other of said ring gears; a drive gear affixed to and surrounding said ring for rotating the latter and thereby transmitting a drive to said pair of driven means; friction clutch means operatively connected to said beveled gears for preventing rotation thereof with respect to each other until a predetermined turning moment is applied to said beveled gears from said gear affixed to said ring; an elongated rod extending through said elongated tube; spring means engaging said rod for shifting the same in one direction with respect to said tube; and a pair of adjusting members one of which is in operative engagement with said rod for movement therewith and the other of which is in engagement with said friction clutch means for transmitting the force of said spring means to said friction clutch means in accordance with the space between said pair of adjusting members.

9. A power transmitting arrangement comprising, in combination, support means; a pair of coaxial ring gears carried by said support means for rotation about their common axis; a pair of driven means operatively connected to said pair of ring gears for rotation therewith; a plurality of planetary gears meshing with said pair of ring gears; a pair of sun gears coaxial with the pair of ring gears and respectively meshing with the planetary gears which mesh with said ring gears, said pair of sun gears being formed with axial bores passing therethrough; an elongated hollow tube extending through and beyond said pair of sun gears and being freely turnable with respect to the latter about the common axis thereof; a pair of beveled sun gears respectively fixed to said pair of sun gears for rotation therewith and located between said pair of sun gears and being spaced from and directed toward each other; a plurality of beveled planetary gears meshing with said beveled sun gears; a ring surrounding said beveled gears and located between the planetary gears which mesh with said ring gears; a plurality of shafts respectively extending through said ring in a direction parallel to the common axis of said sun gears and each shaft turnably supporting at free ends respectively extending beyond said ring a planetary gear meshing with one of said ring gears and a planetary gear meshing with the other of said ring gears; a drive gear affixed to and surrounding said ring for rotating the latter and thereby transmitting a drive to said pair of driven means; friction clutch means operatively connected to said beveled gears for preventing rotation thereof with respect to each other until a predetermined turning moment is applied to said beveled gears from said gear affixed to said ring; an elongated rod extending through said elongated tube; spring means engaging said rod for shifting the same in one direction with respect to said tube; a pair of adjusting members one of which is in operative engagement with said rod for movement therewith and the other of which is in engagement with said friction clutch means for transmitting the force of said spring means to said friction clutch means in accordance with the space between said pair of adjusting members; and frictionless means located between said pair of adjusting members for movement toward and away from said tube, one of said adjusting members having a camming surface engaging said frictionless means for cooperating therewith to change the distance between said adjusting members in accordance with the distance of said frictionless means from said tube.

10. A power transmitting arrangement comprising, in combination, support means; a pair of coaxial ring gears carried by said support means for rotation about their common axis; a pair of driven means operatively connected to said pair of ring gears for rotation therewith; a plurality of planetary gears meshing with said pair of ring gears; a pair of sun gears coaxial with the pair of sun gears and respectively meshing with the planetary gears which mesh with said ring gears, said pair of sun gears being formed with axial bores passing therethrough; an elongated hollow tube extending through and beyond said pair of sun gears and being freely turnable with respect to the latter about the common axis thereof; a pair of beveled sun gears respectively fixed to said pair of sun gears for rotation therewith and located between said pair of sun gears and being spaced from and directed toward each other; a plurality of beveled planetary gears meshing with said beveled sun gears; a ring surrounding said beveled gears and located between the planetary gears which mesh with said ring gears; a plurality of shafts respectively extending through said ring in a direction parallel to the common axis of said sun gears and each shaft turnably supporting at free ends respectively extending beyond said ring a planetary gear meshing with one of said ring gears and a planetary gear meshing with the other of said ring gears; a drive gear affixed to and surrounding said ring for rotating the latter and thereby transmitting a drive to said pair of driven means; friction clutch means operatively connected to said beveled gears for preventing rotation thereof with respect to each other until a predetermined turning moment is applied to said beveled gears from said gear affixed to said ring; an elongated rod extending through said elongated tube; spring means engaging said rod for shifting the same in one direction with respect to said tube; a pair of adjusting members one of which is in operative engagement with said rod for movement therewith and the other of which is in engagement with said friction clutch means for transmitting the force of said spring means to said friction clutch means in accordance with the space between said pair of adjusting members; frictionless means located between said pair of adjusting members for movement toward and away from said tube, one of said adjusting members having a camming surface engaging said frictionless means for cooperating therewith to change the distance between said adjusting members in accordance with the distance of said frictionless means from said tube, said frictionless means including a plurality of coaxial rolling bodies; and shiftable means carried by said support means for shifting movement along the common axis of said sun gears and engaging one of said rolling bodies for shifting the latter toward said tube against the force of said spring means to increase the force required to cause said friction clutch means to slip.

References Cited in the file of this patent
UNITED STATES PATENTS

| | | |
|---|---|---|
| 1,494,457 | Woodward | May 20, 1924 |
| 2,102,314 | Fraser | Dec. 14, 1937 |
| 2,151,724 | Wengel | Mar. 28, 1939 |